(12) United States Patent
Webster

(10) Patent No.: US 7,044,156 B2
(45) Date of Patent: May 16, 2006

(54) PIPELINE PROTECTION SYSTEM

(75) Inventor: David Webster, Monmouth (GB)

(73) Assignee: Vetco Gray Controls Limited, Bristol (GB)

( * ) Notice: Subject to any disclaimer, the term of this patent is extended or adjusted under 35 U.S.C. 154(b) by 164 days.

(21) Appl. No.: 10/834,409

(22) Filed: Apr. 29, 2004

(65) Prior Publication Data

US 2004/0261857 A1 Dec. 30, 2004

(30) Foreign Application Priority Data

Apr. 29, 2003 (GB) ................................. 0309687.2

(51) Int. Cl.
*F16K 31/12* (2006.01)
(52) U.S. Cl. ..................... 137/488; 137/492.5; 91/457; 92/130 R
(58) Field of Classification Search ............. 137/487.5, 137/485, 488, 492.5; 91/454, 457, 404; 92/130 R
See application file for complete search history.

(56) References Cited

U.S. PATENT DOCUMENTS

| | | | | | |
|---|---|---|---|---|---|
| 3,788,341 | A | * | 1/1974 | Athy et al. | 137/209 |
| 4,186,766 | A | * | 2/1980 | Snyder | 137/458 |
| 4,240,463 | A | * | 12/1980 | Moore | 137/492.5 |
| 4,319,603 | A | * | 3/1982 | Snyder | 137/492.5 |
| 5,293,910 | A | * | 3/1994 | Mohs | 141/38 |
| 5,396,923 | A | * | 3/1995 | Allen et al. | 137/487.5 |

* cited by examiner

*Primary Examiner*—Eric Keasel
*Assistant Examiner*—Craig Schneider
(74) *Attorney, Agent, or Firm*—Bracewell & Guiliani LLP

(57) ABSTRACT

A protection system for a pipeline comprises a hydraulically actuated valve operable to switchably prevent a flow of fluid from a first section of the pipeline to a second section of the pipeline, a hydraulic fluid source for supplying hydraulic fluid to said hydraulically actuated valve to enable actuation thereof, a vent for venting hydraulic fluid from the hydraulically actuated valve, the hydraulically actuated valve being connected to the vent via a differential pressure valve to control venting of the hydraulically actuated valve, a pressure transfer barrier with a first port connected to the first section of the pipeline and a second port connected to said differential pressure valve, said differential pressure valve being supplied with hydraulic fluid at a reference pressure. If the pressure of fluid in the first section of pipeline exceeds the reference pressure of the hydraulic fluid supplied to the differential pressure valve, the differential pressure valve is caused to be in an open state, thereby causing the hydraulic pressure in the hydraulically actuated valve to be released via the vent. The protection system is of particular application to sub-sea hydrocarbon extraction wells.

10 Claims, 2 Drawing Sheets

PIPELINE PROTECTION SYSTEM

CROSS-REFERENCE TO RELATED APPLICATION

This application claims the benefit of United Kingdom Patent Application No. 0309687.2, filed on Apr. 29, 2003, which hereby is incorporated by reference in its entirety.

TECHNICAL FIELD OF THE INVENTION

The present invention relates to a protection system for a pipeline, for example to safeguard production fluid pipelines in sub-sea fluid extraction wells, such as hydrocarbon extraction wells.

BACKGROUND OF THE INVENTION

Production fluid pipelines from wells are generally thin-walled in order to minimise the cost of the pipeline. Thus it is essential that they are protected against excessive pressure that might rupture the pipe, which would be very expensive to replace and cause environmental pollution. A conventional system used to protect pipelines from over-pressure is the high integrity pipeline protection system (HIPPS). Conventionally this is an electro-hydraulic system, employing pressure sensors to measure the pressure in the pipes which are used, through the electronics of a control module, to control the closure of a production pipe HIPPS valve. This retains the high pressure within a short section of pipeline between the production "tree" and the HIPPS valve which is capable of withstanding the pressure. This prevents the main, thinner-walled section of pipe from being exposed to pressure which may exceed the pressure rating.

A prior art HIPPS system for a sub-sea hydrocarbon extraction well is shown schematically in FIG. 1. The comparatively thin-walled production pipeline 1, which in the case of a sub-sea well may be several kilometres long, is connected to a thick-walled production pipeline 2 feeding production fluid from a well tree. The two pipelines are connected via a hydraulically actuated valve comprising HIPPS valve 3 and hydraulic actuator 4. During normal operation, the HIPPS valve 3 is held in an open state by the failsafe hydraulic actuator 4, which is fed with pressurised hydraulic fluid via a directional control valve (DCV) 5 located within a sub-sea control module (SCM) 6 from a hydraulic power unit (HPU) 7 typically located on the sea surface via an umbilical 8. The HPU 7 generally supplies pressurised hydraulic fluid for a multiplicity of hydraulically operated functions on the well. The pressure of the fluid within the pipelines 1 and 2 are measured by pressure sensors 9 and 10 respectively. These sensors are connected to an electronic unit 11 within which a pressure threshold is set, the output of which feeds the DCV 5. When the pressure in the pipeline 2 exceeds the set threshold, the electronics unit 11 operates the DCV 5, thus shutting off the hydraulic feed to actuator 4 and venting from the DCV the hydraulic pressure in the actuator 4. This allows the failsafe mechanism, typically a spring, to close the HIPPS valve 3, thus protecting the pipeline 1. Opening of the HIPPS valve 3 to resume fluid production is then only effected when the output fluid pressure from the well has been controlled, typically by a choke, to reduce the pressure to a safe level.

The conventional HIPPS system shown suffers from the drawback that it relies on electronic pressure sensors. These have been known to fail, which could result in a loss of the HIPPS system, putting the pipeline at risk of damage.

SUMMARY OF THE INVENTION

It is an object of the present invention to provide a reliable protection system for a pipeline. This is achieved by employing a totally hydraulic system, obviating the reliance on electronic pressure sensors.

In accordance with the present invention, there is provided a protection system for a pipeline, comprising a hydraulically actuated valve operable to switchably prevent a flow of fluid from a first section of the pipeline to a second section of the pipeline, a hydraulic fluid source for supplying hydraulic fluid to said hydraulically actuated valve to enable actuation thereof, a vent for venting hydraulic fluid from the hydraulically actuated valve, the hydraulically actuated valve being connected to the vent via a differential pressure valve to control venting of the hydraulically actuated valve, a pressure transfer barrier with a first port connected to the first section of the pipeline and a second port connected to said differential pressure valve, said differential pressure valve being supplied with hydraulic fluid at a reference pressure, such that if the pressure of fluid in the first section of pipeline exceeds the reference pressure of the hydraulic fluid supplied to the differential pressure valve, said differential pressure valve is caused to be in an open state, thereby causing the hydraulic pressure in the hydraulically actuated valve to be released via the vent.

The hydraulically actuated valve is preferably arranged so that when the hydraulic pressure in said valve is released it closes, preventing a flow of fluid from the first section of pipeline to the second section of pipeline.

Preferably, when the pressure of fluid in the first section of pipeline is less than the reference pressure of hydraulic fluid supplied to the first differential pressure valve, said valve is caused to be in a closed state, thereby preventing a venting of the hydraulically actuated valve.

The supply of hydraulic fluid to the hydraulically actuated valve may be controlled by a second differential pressure valve connected to the first differential pressure valve such that when the first differential pressure valve is caused to be in an open state, the second differential pressure valve is caused to be in a closed state, preventing flow of hydraulic fluid to the hydraulically actuated valve.

This second differential pressure valve may be supplied with hydraulic fluid at the reference pressure, and may be connected to the pressure transfer barrier.

Optionally, a directional control valve may be used to control the supply of hydraulic fluid to the hydraulically actuated valve.

The pressure transfer barrier may comprise a movable piston sealed within a cylinder.

In a particularly embodiment, the protection system may be used in a fluid extraction facility.

The fluid extraction facility may further comprise an electro-hydraulic pipeline protection system, such as the conventional HIPPS system.

BRIEF DESCRIPTION OF THE DRAWINGS

The invention will now be described with reference to the accompanying figures, in which.

DETAIL DESCRIPTION OF THE PREFERRED EMBODIMENT

Figure 1:
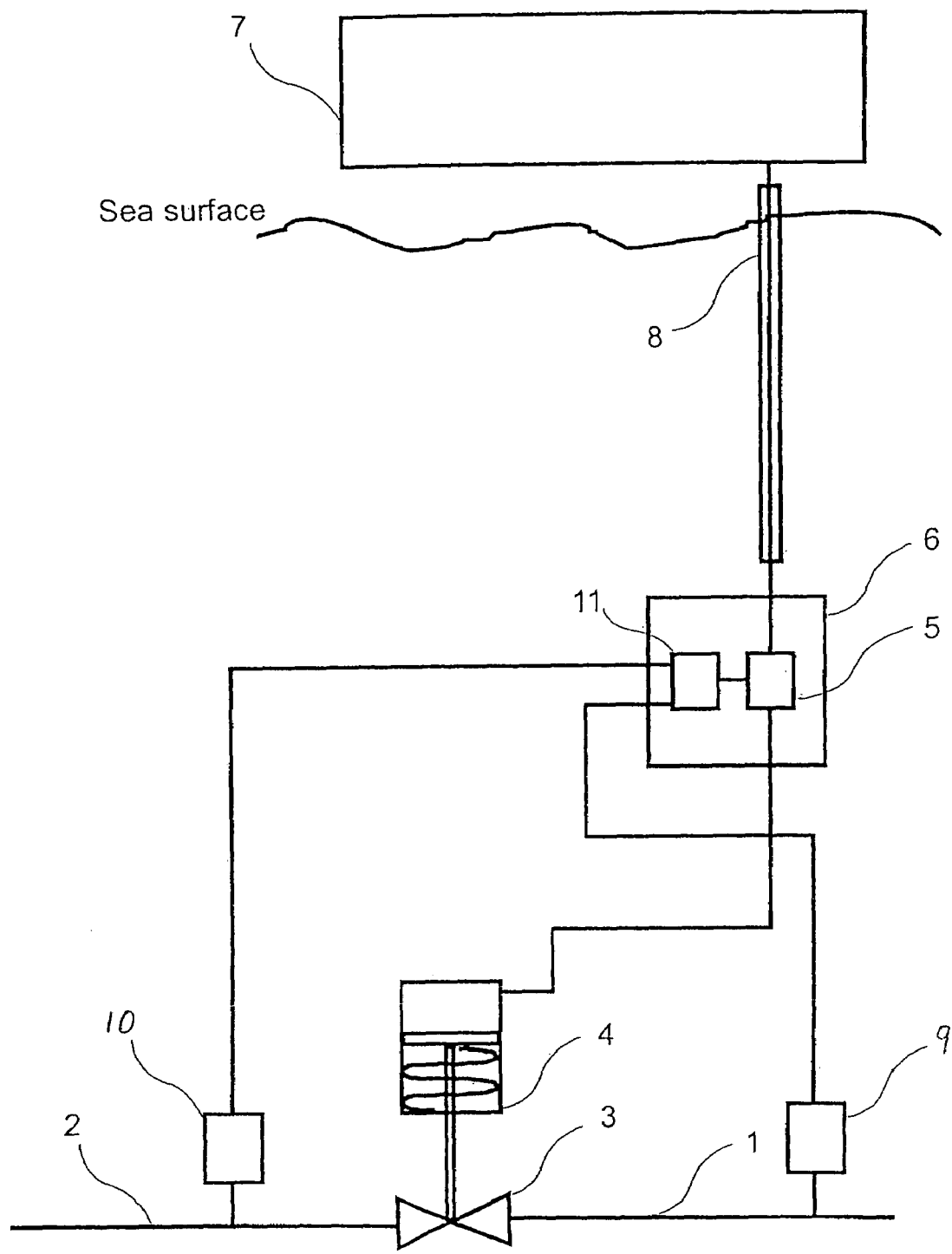
FIG. 1 shows a schematic diagram of a conventional HIPPS system.
Figure 2:
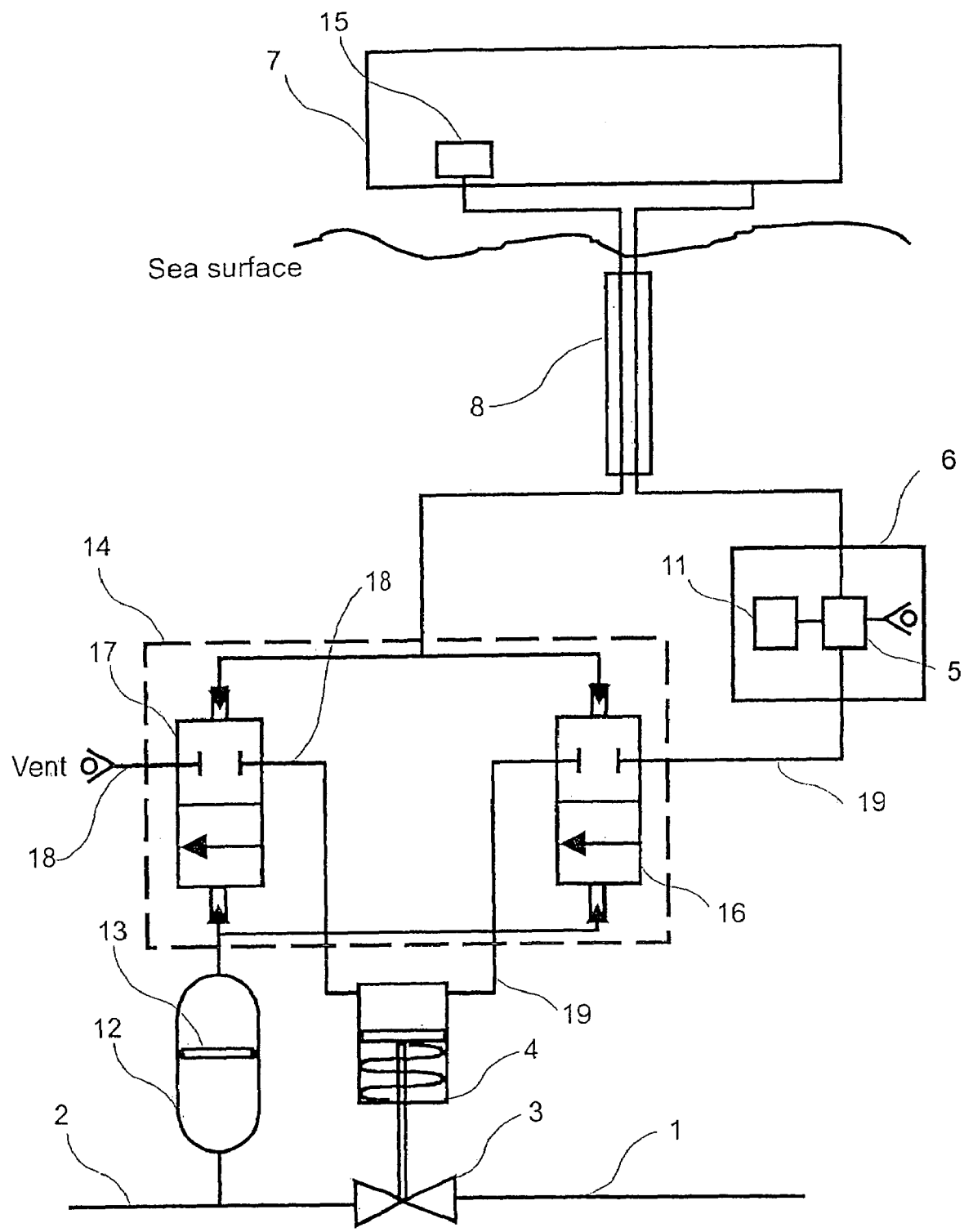
FIG. 2 shows a schematic diagram of an embodiment of the present invention.

Referring now to FIG. 2, an embodiment of the present invention is shown as employed with a fluid extraction facility, in this instance a hydrocarbon extraction well. As in the previously described arrangement, a thin-walled section of pipeline 1 is connected to a thick-walled section of pipeline 2 via a hydraulically actuated valve comprising HIPPS valve 3 and failsafe hydraulic actuator 4. As before, a directional control valve 5 located in a sub-sea control module 6 is used to allow control of the HIPPS valve for purposes other than pressure protection, such as shutting down the production output. The hydraulic actuator 4 is fed hydraulic fluid, typically water-glycol rather than oil, via DCV 5 and umbilical 8 from hydraulic power unit 7, located above the sea surface. The pipeline 2 from the well tree is connected to a pressure transfer barrier 12. This device is shown in sectioned view, and comprises a sealed cylinder with a sliding piston 13 inside which is sealed to the wall of the cylinder. The other side of pressure transfer barrier 12 is filled with hydraulic fluid and is connected to a control port of a pilotless, dual, toggle-action differential pressure operated valve system 14. Valve system 14 comprises two differential pressure valves 16 and 17, connected together so that when one valve is caused to be in a closed state, the other is caused to be in an open state, and vice versa. The other control port of valve system 14 is fed with a reference hydraulic pressure, the pressure being set as required by regulator 15, from the HPU 7 and through umbilical 8. Valve 17 is connected between actuator 4 and a vent via hydraulic feeds 18. Valve 16 is connected between actuator 4 and DCV 5 via hydraulic feeds 19.

The valve system 14 operates due to the differential pressure between the upper (as shown in FIG. 2) chamber of the pressure transfer barrier and the reference pressure from the HPU 7, such that when the pressure in the pressure transfer barrier exceeds that of the reference pressure from the HPU 7, the valve "toggles" i.e. operates. The pressure in the upper chamber of the pressure transfer barrier 12 matches the production fluid pressure in the lower section by virtue of the movement of the piston 13, so that the valve system 14 is caused to toggle when the pressure in pipeline 2 rises above (or falls below) the reference pressure from HPU 7.

Under normal quiescent conditions valve 16 is open, allowing hydraulic fluid to operate the actuator 4 keeping HIPPS valve 3 open, whilst valve 17 is closed. When valve system 14 operates or toggles, valve 16 closes, shutting off the hydraulic feed to the actuator 4, whilst valve 17 opens allowing release of the hydraulic pressure in the actuator 4 to a vent. This allows the spring in the actuator 4 to return the HIPPS valve 3 to the closed position, thus protecting the thin-walled pipeline 1 from damage. Conversely, when the pressure in the production pipe 2 falls below the reference pressure from the HPU 7, the valve system 14 toggles back to its original position allowing opening of the HIPPS valve 3 by the actuator 4.

The above described embodiment is exemplary only, and various other ways of carrying out the invention within the scope of the claims are envisaged. For example, it is possible to achieve the object of the invention by omitting the differential pressure valve 16. In the above-described embodiment, the valve 16 acted to shut off the hydraulic feed to the hydraulically actuated HIEPPS valve while venting from the actuator 4 occurs. However, the bores of the hydraulic feeds 18 from actuator 4 to valve 17 and the vent, and the bore of valve 17 itself may all be greater than the bore of the feed 19 from DCV 5 to actuator 4. This means that it is never possible for the hydraulic fluid flow from the DCV 5 to actuator 4 to match the flow from the actuator. Therefore, as long as valve 17 is open, there will be a decrease in the hydraulic pressure in actuator 4, causing it to operate. Therefore the omission of valve 16 does not compromise the operation of the system, although its inclusion is preferable as it simplifies the control of loss of hydraulic fluid from the system, though alternative methods can be devised to shut off the hydraulic feed, such as closure of the DCV 5, e.g. by manual control.

The protection system of the present invention has the advantages that it is both cheaper and more reliable than the conventional, electronic pressure sensor dependent HIPPS system. However, protection of the production pipeline 1 is so important to fluid extraction operators that the invention could be used in addition to a conventional electro-hydraulic HIPPS system, either in parallel or as a back-up system. Both systems may be fitted to the pipeline at little additional cost.

The invention claimed is:

1. A protection system for a pipeline, comprising a hydraulically actuated valve operable to switchably prevent a flow of fluid from a first section of the pipeline to a second section of the pipeline, a hydraulic fluid source for supplying hydraulic fluid to said hydraulically actuated valve to enable actuation thereof, a vent for venting hydraulic fluid from the hydraulically actuated valve, the hydraulically actuated valve being connected to the vent via a differential pressure valve to control venting of the hydraulically actuated valve, a pressure transfer barrier with a first port connected to the first section of the pipeline and a second port connected to said differential pressure valve, said differential pressure valve being supplied with hydraulic fluid at a reference pressure, such that if the pressure of fluid in the first section of pipeline exceeds the reference pressure of the hydraulic fluid supplied to the differential pressure valve, said differential pressure valve is caused to be in an open state, thereby causing the hydraulic pressure in the hydraulically actuated valve to be released via the vent.

2. A protection system according to claim 1, wherein the hydraulically actuated valve is arranged so that when the hydraulic pressure in said valve is released it closes, preventing a flow of fluid from the first section of pipeline to the second section of pipeline.

3. A protection system according to claim 1, arranged so that when the pressure of fluid in the first section of pipeline is less than the reference pressure of hydraulic fluid supplied to the first differential pressure valve, said valve is caused to be in a closed state, thereby preventing a venting of the hydraulically actuated valve.

4. A protection system according to claim 1, wherein the supply of hydraulic fluid to the hydraulically actuated valve is controlled by a second differential pressure valve connected to the first differential pressure valve such that when the first differential pressure valve is caused to be in an open state, the second differential pressure valve is caused to be in a closed state, preventing flow of hydraulic fluid to the hydraulically actuated valve.

5. A protection system according to claim 4, wherein the second differential pressure valve is supplied with hydraulic fluid at said reference pressure.

6. A protection system according to claim 4, wherein the second differential pressure valve is connected to the pressure transfer barrier.

7. A protection system according to claim 1, comprising a directional control valve to control the supply of hydraulic fluid to the hydraulically actuated valve.

8. A protection system according to claim 1, wherein the pressure transfer barrier comprises a movable piston sealed within a cylinder.

9. A fluid extraction facility comprising the protection system of claim 1.

10. A fluid extraction system according to claim 9, further comprising an electro-hydraulic pipeline protection system.

* * * * *